(12) United States Patent
Greenhalgh et al.

(10) Patent No.: US 11,275,607 B2
(45) Date of Patent: Mar. 15, 2022

(54) IMPROVING THE RESPONSIVENESS OF AN APPARATUS TO CERTAIN INTERRUPTS

(71) Applicant: Arm Limited, Cambridge (GB)

(72) Inventors: Peter Richard Greenhalgh, Cambridge (GB); Antony John Penton, Little Canfield (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/821,151

(22) Filed: Mar. 17, 2020

(65) Prior Publication Data
US 2021/0294642 A1 Sep. 23, 2021

(51) Int. Cl.
| G06F 13/24 | (2006.01) |
| G06F 9/48 | (2006.01) |
| G06F 9/38 | (2018.01) |
| G06F 9/54 | (2006.01) |
| G06F 9/46 | (2006.01) |
| G06F 9/32 | (2018.01) |

(52) U.S. Cl.
CPC ............ G06F 9/4837 (2013.01); G06F 9/321 (2013.01); G06F 9/3844 (2013.01); G06F 9/466 (2013.01); G06F 9/544 (2013.01); G06F 9/546 (2013.01)

(58) Field of Classification Search
CPC ........ G06F 9/4837; G06F 9/321; G06F 9/466; G06F 9/3844; G06F 13/00
See application file for complete search history.

(56) References Cited

U.S. PATENT DOCUMENTS

| 5,838,962 A * | 11/1998 | Larson | ................. G06F 9/3844 |
| | | | 712/239 |
| 2003/0118112 A1* | 6/2003 | Son | ....................... H04N 19/61 |
| | | | 375/240.25 |

* cited by examiner

Primary Examiner — Henry Tsai
Assistant Examiner — Kim T Huynh
(74) Attorney, Agent, or Firm — Nixon & Vanderhye P.C.

(57) ABSTRACT

An apparatus and method are described, the apparatus comprising processing circuitry to perform data processing operations, microarchitecture circuitry used by the processing circuitry during performance of the data processing operations, and an interface to receive interrupt requests. The processing circuitry is responsive to a received interrupt request to perform an interrupt service routine, and the apparatus comprises prediction circuitry to determine a predicted time of reception of a next interrupt of at least one given type. The apparatus also comprises microarchitecture control circuitry arranged to vary a configuration of the microarchitecture circuitry between a performance based configuration and a responsiveness based configuration in dependence on the predicted time, so as to seek to increase the responsiveness of the apparatus to interrupts as the predicted time is approached.

22 Claims, 8 Drawing Sheets

IMPROVING THE RESPONSIVENESS OF AN APPARATUS TO CERTAIN INTERRUPTS

BACKGROUND

Technical Field

The present technique relates to the field of data processing. More particularly, the present technique relates to the handling of interrupts.

Technical Background

In a typical data processing system, an interrupt signal may be received indicating an event that requires attention from processing circuitry of a data processing system. The processing circuitry will typically respond to the interrupt signal by suspending its current activities (e.g. interrupting the code currently being executed by the processing circuitry) and executing an interrupt service routine (ISR) to deal with the event.

In such systems, it is desirable for the processing circuitry to be able to respond to at least certain types of interrupts rapidly.

SUMMARY

In one example, the present technique provides an apparatus comprising:
processing circuitry to perform data processing operations;
microarchitecture circuitry used by the processing circuitry during performance of the data processing operations; and
an interface to receive interrupt requests;
the processing circuitry being responsive to a received interrupt request to perform an interrupt service routine;
the apparatus further comprising:
prediction circuitry to determine a predicted time of reception of a next interrupt of at least one given type; and
microarchitecture control circuitry arranged to vary a configuration of the microarchitecture circuitry between a performance based configuration and a responsiveness based configuration in dependence on the predicted time, so as to seek to increase the responsiveness of the apparatus to interrupts as the predicted time is approached.

Viewed from another example, the present technique provides a method of operating an apparatus, the method comprising:
performing data processing operations using microarchitecture circuitry;
receiving interrupt requests and responding to a received interrupt request by performing an interrupt service routine;
determining a predicted time of reception of a next interrupt of at least one given type; and
varying a configuration of the microarchitecture circuitry between a performance based configuration and a responsiveness based configuration in dependence on the predicted time, so as to seek to increase the responsiveness of the apparatus to interrupts as the predicted time is approached.

Viewed from another example, the present technique provides an apparatus comprising:
means for performing data processing operations using microarchitecture means;
means for receiving interrupt requests;
means for responding to a received interrupt request by performing an interrupt service routine;
means for determining a predicted time of reception of a next interrupt of at least one given type; and
means for varying a configuration of the microarchitecture means between a performance based configuration and a responsiveness based configuration in dependence on the predicted time, so as to seek to increase the responsiveness of the apparatus to interrupts as the predicted time is approached.

Further aspects, features and advantages of the present technique will be apparent from the following description of examples, which is to be read in conjunction with the accompanying drawings.

DESCRIPTION OF EXAMPLES

Figure 1:
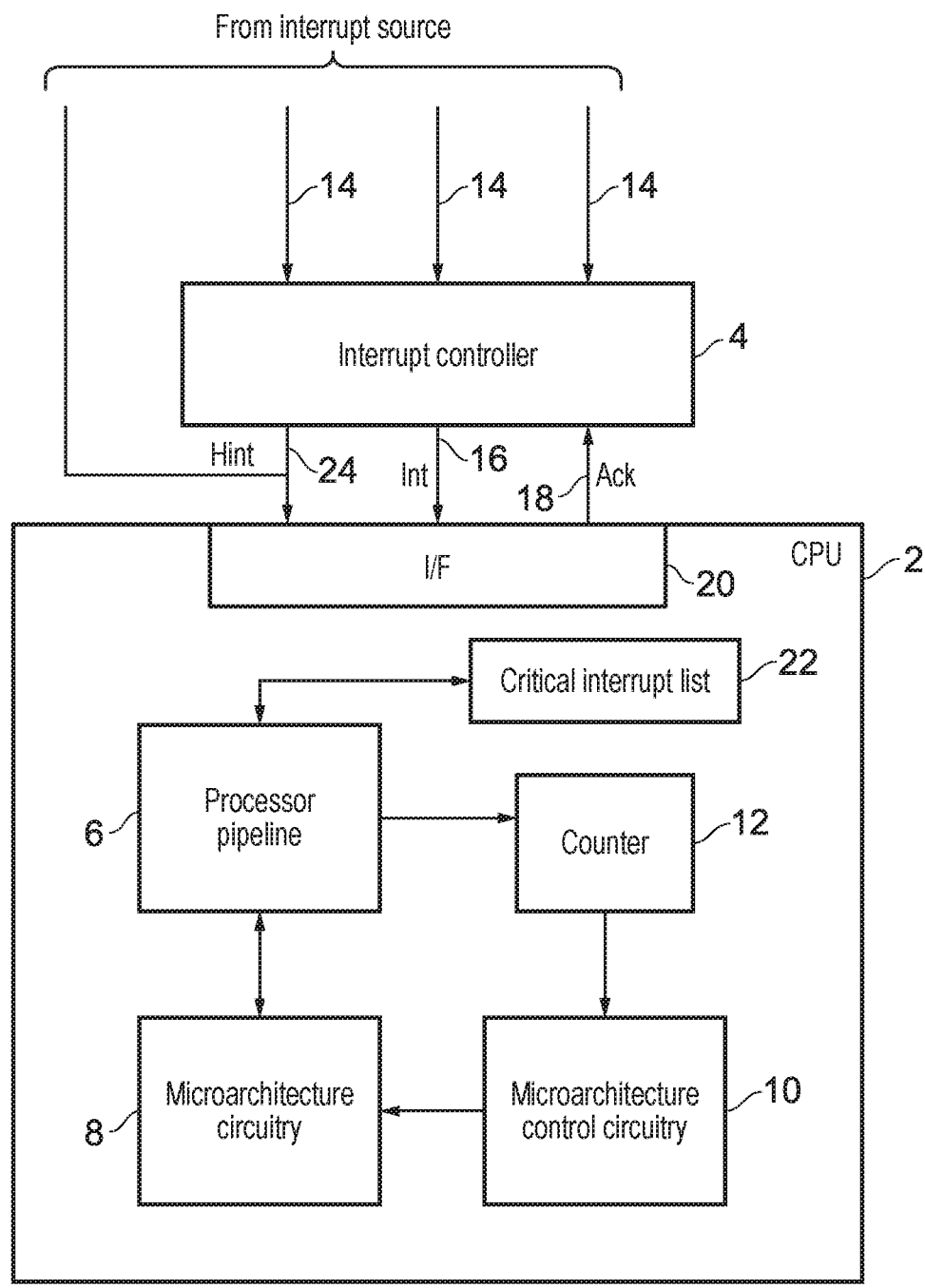
FIG. 1 schematically illustrates an example of a data processing system having microarchitectural circuitry (also referred to herein as microarchitecture circuitry) in a central processing unit.

In a data processing system, processing circuitry may make use of certain microarchitectural components (microarchitectural circuitry) when performing data processing operations. The microarchitectural circuitry is often arranged in a manner aimed at improving the overall performance of the system. This is clearly advantageous during normal operation, but it has been found that such an arrangement of the microarchitectural circuitry can lead to reduced responsiveness of the data processing system to interrupts. Merely by way of illustrative example, when a write request is issued by the processing circuitry, microarchitecture circuitry in the form of a write buffer may be provided to temporarily store the write request and associated write data prior to the required write operation being performed in memory, with a write response being issued to the processing circuitry once the write request is added into the write buffer, thereby avoiding the processing circuitry needing to await completion of the actual write operation in memory before continuing its operations. As the number of entries in the write buffer is increased, this can increase the overall performance of the processing circuitry. However, on receiving an interrupt, it may be necessary for the write buffer to be drained before the interrupt service routine can be performed, and this can hence significantly impact the responsiveness of the apparatus to such an interrupt.

The present technique seeks to address this problem in order to provide a system which can provide the advantages of both high performance during normal operation and high responsiveness to at least certain types of interrupts. In particular, the present technique provides processing circuitry (e.g. a processor pipeline) to perform data processing operations, and microarchitecture circuitry to be used by the processing circuitry during performance of the data processing operations. The apparatus includes an interface to receive interrupt requests (interrupt signals), and the processing circuitry is responsive to a received interrupt request to perform an interrupt service routine (ISR). The apparatus additionally includes prediction circuitry to determine a predicted time of reception of a next interrupt of at least one given type, and microarchitecture control circuitry arranged to vary a configuration of the microarchitecture circuitry between a performance based configuration and a responsiveness based configuration in dependence on the predicted time, so as to seek to increase the responsiveness of the apparatus to interrupts as the predicted time is approached.

By varying the configuration of the microarchitecture circuitry in dependence on the predicted time of reception of the next interrupt of the at least one given type, the present technique allows for the benefits of both high performance during normal operation, and high responsiveness to certain interrupts to be provided. In particular, by taking the above approach, the apparatus can be tailored to be more responsive when an interrupt of a given type is expected, and more performant at other times.

It should be noted that while it is not guaranteed that an interrupt will occur at the predicted time, an incorrect prediction such as this does not prevent the apparatus from operating normally. If the predicted time is too early (e.g. if no interrupt arrives at a time when an interrupt is predicted), this simply means that the prediction was pessimistic, and that performance of the system is temporarily reduced without preventing the apparatus from operating correctly. Moreover, it may take time for the microarchitecture circuitry to adjust from the performance-based configuration to the responsiveness-based configuration, so an incorrect prediction may simply reduce or increase the amount of time available for this adjustment to take place.

It should further be noted that, whilst in one example implementation there may be just two distinct configurations of the microarchitecture control circuitry, in other example implementations there may be one or more intervening configurations between the performance based configuration and the responsiveness based configuration.

In some examples, the prediction circuitry is counter circuitry arranged to maintain a count value dependent on the predicted time of reception of the next interrupt of the at least one given type.

The counter may be an incrementing counter or a decrementing counter, and the microarchitecture control circuitry in this example is responsive to the count value indicated by the counter circuitry to vary the configuration of the microarchitecture circuitry between the performance based configuration and the responsiveness based configuration. The count value will be set based on the predicted time, but can take a variety of forms. For example, the count value may give an indication of the predicted time, or it may give an indication of a time earlier than the predicted time, in order to allow the microarchitecture control circuitry time to adjust the configuration of the microarchitecture circuitry from the responsiveness based configuration to the performance based configuration.

Counter circuitry is a particularly efficient technique for implementing the prediction circuitry, especially since typical data processing systems already include at least one counter for other purposes—this approach may therefore take advantage of existing hardware. For example, the counter circuitry may be a shared hardware counter in the apparatus, and a storage location within the apparatus may be updated to indicate a count value of the shared hardware counter depending on the predicted time. However, it should be noted that the counter could instead be a dedicated hardware counter.

There are a number of ways in which the predicted time of the next interrupt of the at least one given type could be determined. In some examples, the processing circuitry is arranged to execute interrupt timing prediction software to determine the predicted time and to set the prediction circuitry dependent on the predicted time.

More particularly, in some examples, the processing circuitry may be arranged to execute the interrupt timing prediction software as part of the interrupt service routine. For example, the processing circuitry may be arranged to call the interrupt timing prediction software during execution of the ISR. This allows the ISR to easily be modified to implement the present technique.

In some examples, the processing circuitry is arranged to execute the interrupt timing prediction software at a tail end of the interrupt service routine before returning to background processing that was being performed prior to the interrupt service routine being performed.

As discussed above, reception of an interrupt request may trigger the processing circuitry to suspend processing and process an ISR instead. Therefore, in these examples, the processing circuitry calls the interrupt timing prediction software during or immediately after executing the main body of the ISR, and executes the interrupt timing prediction software before returning to the background processing that was suspended when the interrupt signal was received. As above, this is a simple way of modifying the ISR to implement the present technique, and allows the more urgent actions of the ISR (e.g. actions involved in dealing with the interrupt itself) to be prioritised over execution of the interrupt timing prediction software.

In some examples, the at least one given type of interrupt for which the prediction circuitry determines a predicted time of the next interrupt comprises one or more types of interrupts having a priority above a threshold level. Such interrupts may be referred to herein as high priority interrupts or critical interrupts.

It will be appreciated that a determination of which types of interrupts are considered to be critical interrupts may be implementation specific. However, in at least some examples, critical interrupts may be interrupts related to actual control input and output. For example in a hard disc the position of the read/write head may be continually adjusted based on incoming data from sensors. Keeping the associated feedback loop short can be critical to the accuracy of the head positioning and therefore the data density on the drive. Thus, interrupts associated with the positioning of the read/write head may, in some examples, be considered to be critical interrupts.

Some types of interrupt may require a more rapid response than others. In these examples such types of interrupt are deemed to have a priority above the threshold level, and it is in anticipation of these critical interrupts that the configuration of the microarchitecture circuitry is adjusted towards the responsiveness based configuration. By only adjusting the configuration in anticipation of critical interrupts, a more performance based configuration can be maintained for more of the time, improving the performance of the system.

In some examples, an interrupt list (which may also be referred to herein as a critical interrupt list) is provided to maintain information relating to a predicted time of reception of a next interrupt of each of the one or more types, and the processing circuitry executes interrupt timing prediction software to determine the predicted time based on the interrupt list and to set the prediction circuitry in dependence on the predicted time.

The interrupt list may be maintained in a storage unit within the apparatus, and allows separate predictions of the timings of the next interrupts for multiple types of interrupt to be maintained. The information relating to the predicted time of reception of the next interrupt of each type could indicate the actual predicted time of reception, or it may indicate a different time dependent on the predicted time. For example, the information related to the predicted time could be a time prior to the predicted time, that would allow the microarchitecture control circuitry time to adjust the microarchitecture circuitry from the performance based configuration to the responsiveness based configuration.

In some examples, the interrupt list may take the form of a table indicating each of the one or more types of interrupt for which information related to a predicted time of reception is to be maintained (in one example implementation each of the above-mentioned critical interrupts), and information related to a predicted timing of the next interrupt for each type. Interrupts of different types may include interrupts received from different sources, for example.

In some examples the processing circuitry is responsive to determining, from the interrupt list, that the predicted time of reception of the next interrupt is in the past to send a request to an external source associated with the next interrupt to request information indicative of a timing of the next interrupt.

Such a situation may arise, for example, when a predicted time of at least one of the critical interrupts turns out to be incorrect. For example, if the next critical interrupt does not arrive until some time after the predicted time, then it may be that when the list is next referred to the predicted time of reception of the next interrupt is in the past.

This could also for example occur if the interrupt service routine for a currently received interrupt takes a significant time to perform, and the predicted time of reception of multiple different types of interrupt are similar. For example, if two interrupts arrive at a similar time then the apparatus may still be handling the first when the second arrives. Depending on the relative priorities the apparatus might finish handling the first interrupt, or prioritise the second interrupt before returning to the first interrupt. However, if the apparatus does handle the first interrupt, including updating predictions, before starting on the second interrupt then the above scenario (the prediction is in the past) can occur.

Whenever such a situation arises, it is useful to be able to determine an updated prediction of the timing of the next interrupt by requesting information from the associated external source. The information requested by the processing circuitry may be an indication of the time of the next interrupt of a given type from that external source, or an indication of the current periodicity of an interrupt of the given type from that source, for example. It should be noted that the sending of the request may be performed as a function of software being executed by the processing circuitry. For example, the interrupt timing prediction software may include a function for sending the request.

The microarchitecture circuitry can take a variety of forms. In some examples, the microarchitecture circuitry is buffer circuitry.

The buffer circuitry may for example be storage circuitry that stores data, instructions, transactions or other items awaiting action by another component within the apparatus. The buffer circuitry may need to be drained when an interrupt is received, to enable the ISR to be carried out. The responsiveness of the apparatus to an interrupt may, therefore, be affected by how quickly the buffer can be drained. Thus, it is advantageous to apply the present technique to the buffer circuitry as the microarchitecture circuitry, adjusting the configuration of the buffer circuitry from a performance based configuration to a responsiveness based configuration as the predicted time is approached.

In some examples, the microarchitecture control circuitry is configured to vary the configuration of the buffer circuitry in dependence on the predicted time to reduce occupancy of the buffer circuitry as the predicted time is approached. Reducing the occupancy of the buffer circuitry allows the buffer to be drained more quickly when an interrupt signal is received, allowing the responsiveness of the apparatus to the interrupt to be improved. Reducing the occupancy may also worsen the performance of the apparatus, but the present technique allows this reduction in performance to be confined to times when an interrupt of the at least one given type is predicted to be imminent. The performance benefits associated with a buffer having increased occupancy can thus be maintained at other times, increasing the overall performance of the apparatus.

The occupancy of the buffer circuitry can be reduced in any of a number of ways. For example, the occupancy of the buffer circuitry may be reduced by reducing the number of usable entries in the buffer circuitry. This could involve invalidating a number of entries in the buffer circuitry, or flushing data from those entries. Alternatively, the occupancy of the buffer circuitry could be reduced by limiting the total number of entries that can be allocated to.

In other examples, the occupancy of the buffer circuitry can be reduced by inhibiting allocation of entries into the buffer circuitry. This allows the number of occupied entries in the buffer to be gradually reduced as pending transactions, instructions or data are processed.

In some examples, the buffer circuitry may comprise a transaction queue.

A transaction queue may be used to buffer transactions awaiting processing within the memory system, and may allow, for example, multiple transactions to be retrieved and processed in parallel, improving the performance of the system. However, the transaction queue may need to be drained when an interrupt signal is received to allow the apparatus to carry out the ISR. Thus, the responsiveness of the apparatus to interrupts may be affected by the occupancy of the transaction queue. It is therefore advantageous to apply the present technique to the transaction queue as the microarchitecture circuitry.

In some examples, the apparatus includes snoop control circuitry to manage coherency of data stored in caches of a plurality of processing units, and the buffer circuitry may comprise one or more buffers associated with the snoop control circuitry.

In such examples, snoop control circuitry (also referred to as a snoop control unit (SCU)) is arranged to maintain coherency between data caches in multiple processing units. In particular, when the snoop control circuitry receives an access request specifying a cacheable address in memory, it may be arranged to determine (for example with reference to a snoop filter) which local data caches of the processing units need to be subjected to a snoop operation in order to determine if they hold a copy of the requested data. The snoop control circuitry also needs to arbitrate between such access requests issued by multiple of the processing units. Access requests issued by each processing unit can therefore be placed into one or more buffers associated with the snoop control circuitry to await processing by the snoop control circuitry. These buffers may need to be drained to allow the ISR to be processed in response to receiving an interrupt signal, meaning that the responsiveness of the apparatus to interrupts may be affected by the occupancy of the buffers in the snoop control circuitry. It is therefore advantageous to apply the present technique to the buffers in the snoop control circuitry as the microarchitecture circuitry.

In some examples, the buffer circuitry comprises a reorder buffer used to support out-of-order execution of instructions by the processing circuitry.

To allow the ISR to be processed in response to a received interrupt signal, the reorder buffer may need to be drained. Therefore, the responsiveness of the apparatus to interrupts may be affected by the occupancy of the reorder buffer, and it is thus advantageous to apply the present technique to the reorder buffer as the microarchitecture circuitry.

There are a number of ways in which the predicted time of receipt of interrupts may be determined. It has been found that, for at least some of the high priority interrupts, those interrupts may be expected to occur at periodic intervals. Hence, in some examples, the predicted time for at least one interrupt of the at least one given type is determined based on a periodicity of that interrupt.

The inventors realised that many types of interrupt are periodic, with a period that typically remains constant over a large timescale. This means that it is possible to predict the timing of the next interrupt of the at least one given type based on the periodicity of that type of interrupt, and to set the prediction circuitry accordingly. This is also useful for types of interrupts that do not have a constant period. For example, some interrupts may be approximately periodic (e.g. have a period within a range of timescales), and some may have a variable period that changes slowly. In any case, predicting the timing of the next interrupt of the at least one given type based on a periodicity of the interrupt—even where the period is variable—can still give the processing circuitry enough time to adjust towards the responsiveness-based configuration.

In some examples, the microarchitecture control circuitry is further responsive to a hint signal generated externally to the apparatus to vary the configuration of the microarchitecture circuitry between the performance based configuration and the responsiveness based configuration so as to seek to increase the responsiveness of the apparatus to interrupts, the hint signal indicating an upcoming interrupt of the at least one given type.

A hint signal provides an additional mechanism by which the arrival of a future interrupt can be predicted. The responsiveness of the microarchitecture circuitry can therefore be increased in advance of an expected interrupt for which a hint signal is provided. This can be useful in a variety of situations. For example the hint signal might relate to an interrupt that was not predicted to be the next interrupt by the apparatus. Alternatively the hint signal may relate to the same interrupt that was predicted to be the next interrupt, but the hint signal may occur earlier than the point in time at which the microarchitecture control circuitry would otherwise seek to transition the configuration of the microarchitecture circuitry towards the responsiveness based configuration based on the predicted time.

The hint signal may be received from a number of locations. In some examples, the hint signal comprises a signal generated by an interrupt controller, while in other examples the hint signal comprises a signal generated by an external source of the upcoming interrupt. The apparatus may be arranged to be responsive to hint signals originating from either of these sources, or from both sources.

In some examples the microarchitecture control circuitry is arranged, in the absence of the upcoming interrupt of the at least one given type being received within a predetermined time, to return the microarchitecture circuitry to the performance based configuration.

If the hint signal proves to be incorrect, it is helpful for the microarchitecture control circuitry to be able to transition back to the performance based configuration. An incorrect hint signal may be asserted for a number of reasons, but in some examples the apparatus may be one of a plurality of processing units in a cluster, and the hint signal may be sent to the entire cluster. When the interrupt arrives later, it may be routed by an interrupt controller to a specific processing unit, meaning that the hint signal is incorrect for all of the other processing units.

In some examples, the microarchitecture control circuitry is responsive to a plurality of threshold times prior to the predicted time to vary the configuration of the microarchitecture circuitry between the performance based configuration and the responsiveness based configuration. In these examples, the microarchitecture control circuitry is responsive to at least one of the threshold times to set the configuration of the microarchitecture circuitry to an intervening configuration between the performance based configuration and the responsiveness based configuration.

In this way, the responsiveness of the apparatus can be gradually increased as the predicted time is approached. This approach allows for an improved response even if the predicted time is not quite accurate—for example, if the next interrupt arrives slightly earlier than expected.

Particular embodiments will now be described with reference to the figures.

FIG. 1 schematically illustrates an example of a data processing apparatus in accordance with the present technique. In particular, FIG. 1 shows a central processing unit (CPU) 2 in communication with an interrupt controller 4.

The CPU 2 includes a processor pipeline (processing circuitry) 6 for performing data processing operations (e.g. by executing instructions). The processing circuitry 6 makes use of microarchitecture circuitry 8 during performance of the data processing operations.

The interrupt controller 4 is arranged to receive interrupt signals 14 from external sources, the interrupt signals 14 being indicative of an external event requiring attention from the CPU 2. The interrupt controller 4 then prioritises each received interrupt signal against other active interrupts that have not yet been dealt with by the CPU 2, selecting an interrupt signal 16 to be passed on to the interface 20 of the CPU 2. The CPU 2 may return an acknowledgement signal 18 to inform the interrupt controller 4 that the interrupt signal 16 has been accepted, although it should be appreciated that this is optional.

When an interrupt signal 16 is accepted by the interface 20, the processor pipeline 6 is arranged to suspend any processes that it is currently executing and to execute an interrupt service routine (ISR). The ISR may make use of the microarchitecture circuitry 8, so the responsiveness of the CPU 2 to the interrupt may be limited by the responsiveness of the microarchitecture circuitry 8. In accordance with the techniques described herein, the microarchitecture circuitry 8 can be configured in a responsiveness based configuration, which prioritises responsiveness to interrupts over performance. This is particularly useful in the case of high priority (critical) interrupts, which are interrupts of a type having a priority above a threshold level. However, when the processing pipeline 6 is not responding to an interrupt (e.g. during normal processing), then in accordance with the techniques described herein the microarchitecture circuitry 8 can be arranged in a performance-based configuration, which prioritises performance.

The CPU 2 is arranged to predict when the next critical interrupt is expected, and to vary the configuration of the microarchitecture circuitry 8 as the predicted time of the next critical interrupt is approached. More particularly, at the tail end of the ISR, the processor pipeline 6 can be arranged to call and execute interrupt timing prediction software to determine a predicted time of the next critical interrupt of a particular type (e.g. of the same type or from the same source as the current interrupt being processed). The processing pipeline 6 is then arranged to store information indicative of the predicted time of the next critical interrupt of the particular type to a critical interrupt list 22, and to determine the predicted timing of the next critical interrupt of any type by referencing the critical interrupt list 22. The processing pipeline 6 is then arranged to update a counter 12 (acting as prediction circuitry to determine the predicted time of the next interrupt of the at least one given type) to show a count value dependent on the predicted time. For example, if the counter 12 is a decrementing counter, the count value could be set to indicate a number of cycles until the predicted time. Alternatively, for either a decrementing or incrementing counter, a value may be stored in storage circuitry (not shown) in the processing unit 2 that indicates a count value corresponding to the predicting time, with the microarchitecture control circuitry 10 determining that the predicted time has been reached when the current count value matches or either exceeds (for an incrementing counter) or is exceeded by (for a decrementing counter) the stored count value. The counter may, alternatively, indicate a time prior to the predicted time. This allows the microarchitecture control circuitry 10 time to adjust the configuration of the microarchitecture circuitry 8. The counter 12 may be a dedicated counter, but it may alternatively be a counter that is shared between multiple uses.

The critical interrupt list 22 may be stored in a local storage unit within the CPU 2. It should be noted, however, that the critical interrupt list 22 need not necessarily be provided. The processing pipeline 6 may instead be arranged to determine the predicted time of reception of the next critical interrupt without referencing the critical interrupt list 22; for example, the processing pipeline 6 may be arranged to only predict upcoming interrupts of a given type or from a given source, which would mean that it does not need to reference the critical interrupt list 22.

In any case, microarchitecture control circuitry 10 is then arranged to vary a configuration of the microarchitecture circuitry 8 between a performance based configuration and a responsiveness based configuration in dependence on the predicted time. More particularly, the microarchitecture control circuitry 10 is responsive to the count value indicated by the counter 12 reaching a predetermined (threshold) level, to adjust the configuration of the microarchitecture circuitry 8 to a responsiveness based configuration, which increases the responsiveness of the microarchitecture circuitry 8 to interrupts, thus improving the responsiveness of the overall system to interrupts. For example, if the microarchitecture circuitry 8 is buffer circuitry, the microarchitecture control circuitry 10 may cause the occupancy of the buffer circuitry to be reduced as the predicted time of reception of the next critical interrupt is approached.

The microarchitecture control circuitry 10 may be responsive to a plurality of threshold count values, to adjust the configuration of the microarchitecture circuitry 8 in stages. For example, when the microarchitecture circuitry 8 is buffer circuitry, the microarchitecture control circuitry 10 may be responsive to a first threshold count value to reduce the occupancy of the buffer to a first level, responsive to a second threshold count value to reduce the occupancy to a second, lower, level, and so on.

It may take time for the microarchitecture circuitry 8 to adjust to the responsiveness based configuration, so the count value and the plurality of threshold values may be set far enough in advance of the predicted time of reception of the next interrupt to ensure that there is enough time for the adjustment to take place. Moreover, the count value and the threshold values may be set taking into account a margin of error in the predicted time, so that if the interrupt arrives earlier than expected, the microarchitecture circuitry 8 may still be prepared to receive the interrupt. However, there may be a trade off between increasing the likelihood that the microarchitecture circuitry 8 will be prepared for the interrupt when it arrives, and the performance issues associated with adjusting to the responsiveness based configuration earlier.

It should be noted that while the microarchitecture control circuitry 10 is shown in FIG. 1 as a dedicated hardware component, it may alternatively be included within the processor pipeline 6.

The interface 20 of this example is also arranged to receive a hint signal 24 indicative of an upcoming interrupt. The hint signal 24 may be a signal generated by the interrupt controller 4, or it may be a signal originating from an external interrupt source. In any case, the microarchitecture control circuitry 10 can be arranged to be responsive to the hint signal 24 to adjust the configuration of the microarchitecture circuitry 8 from the performance based configuration towards the responsiveness based configuration.

In this way, using either the counter, the hint signal, or both, the responsiveness of the apparatus to interrupts can be improved without sacrificing the performance benefits associated with a more performance based configuration of the microarchitecture circuitry 8 during normal operation of the apparatus.

Figure 2:
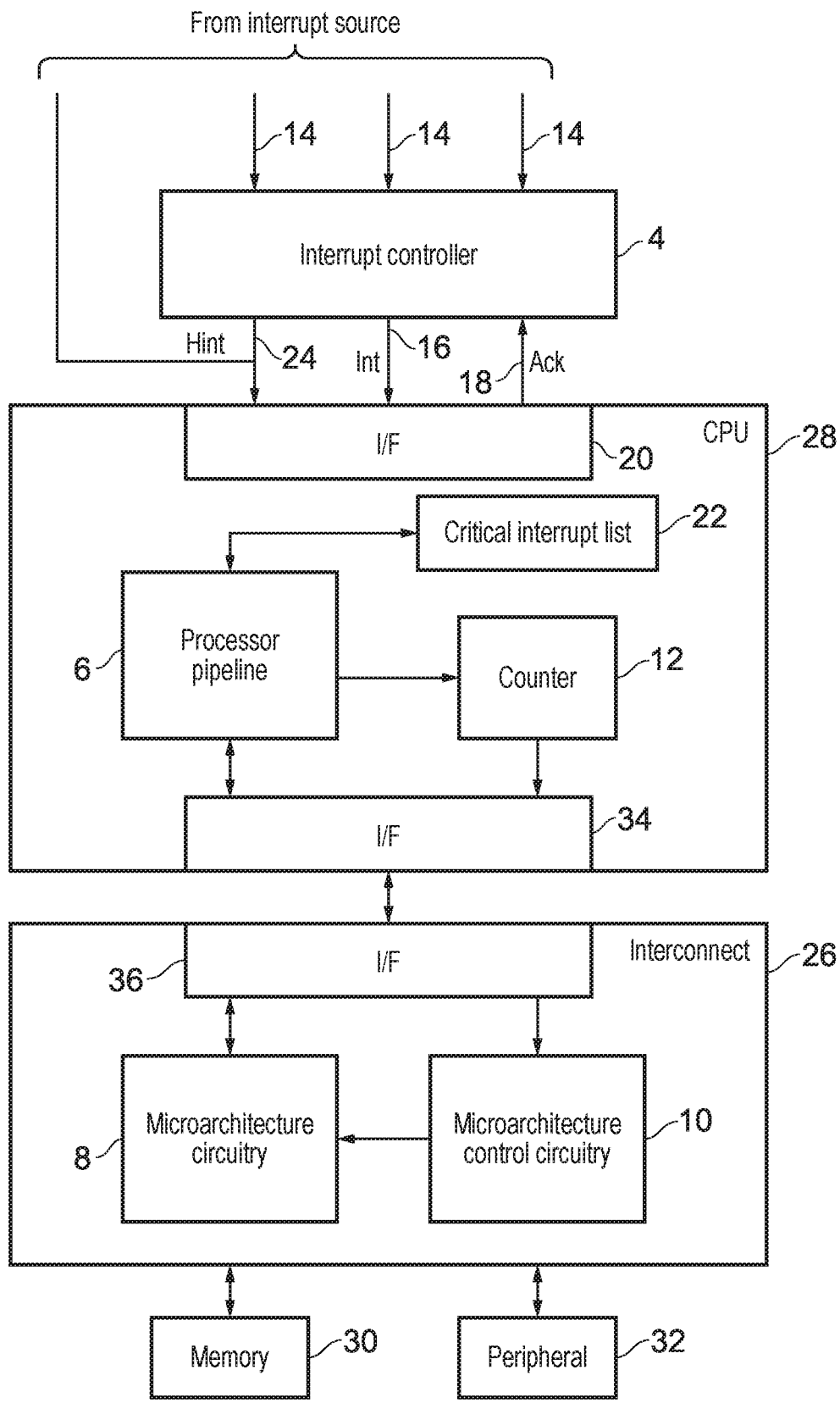
FIG. 2 schematically illustrates an example of a data processing system having microarchitectural circuitry in an interconnect.

FIG. 2 schematically illustrates a data processing system in which a CPU 28 communicates with a memory 30 and other peripheral devices 32 via a shared interconnect 26. In this example, the CPU 28 communicates with the interconnect 26 via interfaces 34, 36, and the microarchitecture circuitry 8 and microarchitecture control circuitry 10 are found in the interconnect 26. In the example of FIG. 2, a predicted time of a next critical interrupt is determined in the same way as in the example of FIG. 1, except that any communication between the elements in the CPU 28 (the processor pipeline 6, the counter 12 and the critical interrupt list 22) and the elements in the interconnect 26 (the microarchitecture circuitry 8 and the microarchitecture control circuitry 10) takes place via the interfaces 34, 36.

Thus, the present technique may be applied to microarchitecture circuitry 8 within an interconnect 26, as well as microarchitecture circuitry 8 within the CPU 2.

It should be noted that while FIGS. 1 and 2 illustrate examples of microarchitecture circuitry 8 being within the CPU 2 and within the interconnect 26 as separate examples, it is also possible for the present technique to be applied to both examples in the same system.

Figure 3:
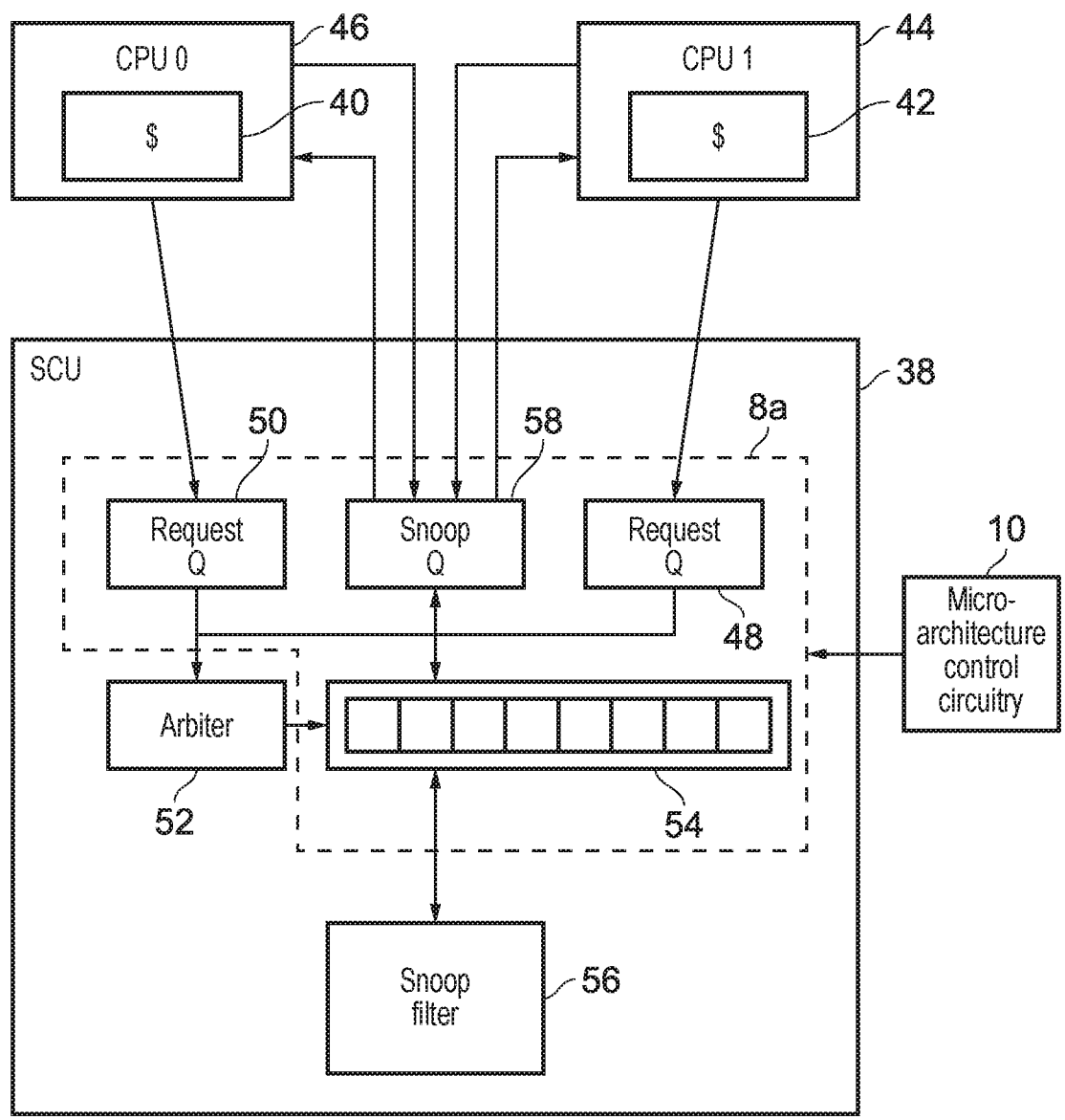
FIG. 3 schematically illustrates a data processing system having a snoop control unit containing microarchitectural circuitry.

FIG. 3 schematically illustrates an example of the present technique as applied within a snoop control unit (SCU) 38 (also referred to as snoop control circuitry). The SCU may for example be provided within an interconnect used to interconnect multiple processing units with components such as memory and peripheral devices (not shown). The SCU 38 is arranged to maintain coherency between the data stored in a number of local caches 40, 42 in a plurality of processing units 46, 44 that share access to memory (not shown). When an access request issued by a processing unit misses in its local cache (or for certain types of access even if a hit is detected), that access request may be propagated to the SCU 38, causing the SCU 38 to seek to determine whether any of the other local caches store a copy of the data identified by the access request. In that event a snoop operation can be initiated in the relevant local cache(s), causing the local cache to undertake an appropriate coherency action, which may for example cause the local cache to invalidate its copy of the data, and in some instances return that data to the SCU for propagation back to the requesting processing unit. Typically, when the local cache has performed the coherency action required by the snoop operation, a snoop response will be returned to the SCU.

In one example implementation, data access requests (e.g. read requests or write requests) may be received by the SCU 38 from the processing units 44, 46 and stored in associated request queues 48, 50. The request queues 48, 50 are buffer circuits for storing the data access requests awaiting processing by an arbiter 52. The arbiter 52 arbitrates between data access requests in the request queues 48, 50 before inputting them into a request pipeline 54. The arbiter 52 therefore acts as a point of serialisation of pending data access requests in the SCU 38.

The data access requests stored in the request pipeline 54 are accessible to a snoop filter 56 and a snoop queue 58. The access requests in the request pipeline are processed in order by the snoop filter. The snoop filter maintains coherence data for various address ranges, the coherence data identifying which local caches have cached data in those address ranges (in one example implementation each address range may correspond to a cache line sized block of data). Hence the coherence data can be used to identify which local caches need subjecting to a snoop operation based on an access request currently being considered, and for each local cache identified as potentially caching a copy of the data at the address specified by the access request, a snoop request can be placed in the snoop queue 58. Each snoop request in the snoop queue can then be dispatched to the relevant CPU/local cache. Snoop responses from the CPUs/local caches can also be buffered in a snoop queue 58 for reference by the SCU.

When an interrupt signal is received by one of the processing units 44, 46 associated with the SCU 38, one or more data access requests may need to be made as part of the ISR. These data access requests may be routed via the SCU 38, meaning that the responsiveness of the overall system to an interrupt may be affected by the responsiveness of the SCU 38 to the associated data access requests. In particular, one or more of the various buffers within the SCU 38 (the request queues 48, 50, the request pipeline 54 and the snoop queue 58) may need to be drained before the SCU 38 can respond to any data access requests associated with the ISR. These buffers are therefore an example of microarchitecture circuitry 8a.

The responsiveness of the SCU 38 to data access requests issued as part of the ISR depends on how quickly the required buffers in the microarchitecture circuitry 8a can be drained of pending requests, which in turn is dependent on the number of entries stored in each buffer. Therefore, the responsiveness of the SCU 38 to data access requests associated with the ISR (and, by extension, the responsiveness of the system as a whole to an interrupt) can be improved by reducing the number of entries stored in each buffer, allowing them to be drained more rapidly. Therefore, in this example, the microarchitecture control circuitry 10 (which may be in one of the processing units 44, 46 or within the interconnect containing the SCU) is arranged to control the buffers of the microarchitecture circuitry 8a to reduce the number of entries they store as the predicted time of reception of the next critical interrupt is approached. This is an example of a responsiveness based configuration of the microarchitecture circuitry 8a, and may be achieved either by reducing the number of usable entries in the buffers, or by preventing new entries from being allocated. As a result, the responsiveness of the system to interrupts can be improved when it is predicted that a critical interrupt is imminent by improving the responsiveness of the microarchitecture circuitry 8a to data access requests associated with the ISR. By adjusting the microarchitecture circuitry 8a to the responsiveness based configuration as the predicted time of reception of the next critical interrupt approaches, but remaining in a performance based configuration (e.g. making use of all of the entries of the buffers of the microarchitecture circuitry 8a) the rest of the time, the benefits of improved performance of the processing system can be achieved without sacrificing the responsiveness of the system to interrupts.

The number of entries in each of the buffers of the microarchitecture circuitry 8a may be reduced gradually, as the predicted time of reception of the next interrupt is approached. For example, the microarchitecture control circuitry 10 may be responsive to a number of threshold count values indicated by the counter circuitry 12 (not shown) to reduce the number of entries in stages. The counter circuitry 12 in this example may be located at a variety of locations, but in one example may take the form of a counter shared between all of the processing units 44, 46. For example, the microarchitecture control circuitry 10 may be responsive to the count value reaching a first threshold value to reduce the number of available entries to a first level, responsive to a second threshold value to reduce the number of available entries to a second, lower, level, and so on.

Figure 4:
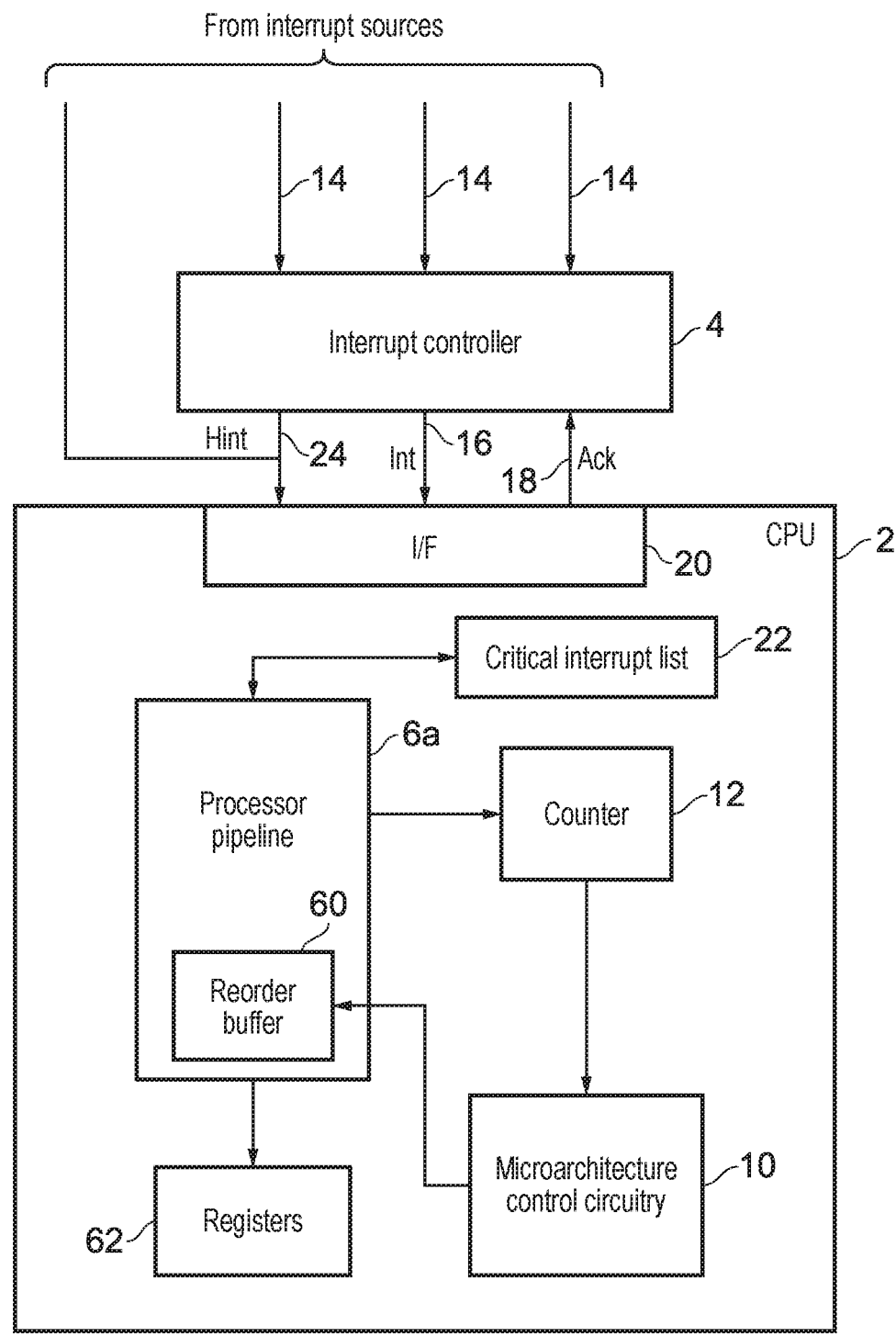
FIG. 4 schematically illustrates an example of a data processing system with a reorder buffer as microarchitectural circuitry.

FIG. 4 schematically illustrates another example of a data processing system in accordance with the present technique. In the data processing system of FIG. 4, the interrupt controller 4, counter 12, microarchitecture control circuitry 10 and critical interrupt list 22 are configured in the same way as in FIG. 1. In this particular example, the CPU 2 also includes a reorder buffer 60 within the processor pipeline 6a, and a register file 62. The reorder buffer 60 supports out-of-order execution of instructions by the processor pipeline 6a (thereby enabling speculative execution of at least some instructions before it is known whether those instructions will in fact need executing), and is an example of microarchitectural circuitry 8. More particularly, results from operations performed by the processor pipeline 6a are stored in the reorder buffer 60 before being committed. When a result value written to the reorder buffer 60 is committed (e.g. when it is no longer considered to be speculative) it is written to the register file 62.

When processing an interrupt, it may be necessary to drain the reorder buffer before executing instructions forming the ISR, in order to ensure that all instructions that are considered to have been completed before the point at which the interrupt is taken (and hence will not be re-executed when normal processing is resumed after the returning from the ISR) have their results committed to the registers. Therefore, the responsiveness of the system to interrupts may be affected by how long it takes to drain the reorder buffer 60 (which is an example of microarchitecture circuitry 8).

Thus, in accordance with the present technique, the microarchitecture control circuitry 10 is responsive to the count value of counter 12 to vary the configuration of the reorder buffer 60 from a performance based configuration to a responsiveness based configuration. More particularly, the microarchitecture control circuitry 10 may cause the occupancy of the reorder buffer to be reduced as the predicted time of reception of the next critical interrupt is approached. As in the examples discussed above, this may involve reducing the number of useable entries in the reorder buffer 60, or inhibiting allocations for new instructions into entries into the reorder buffer 60 (thereby effectively reducing the degree of out-of-order execution available, and thus reducing the number of instructions to be completed (and drained from the reorder buffer) in response to receiving an interrupt signal). Also, as with the previous example, the microarchitecture control circuitry 10 may be responsive to multiple threshold count values of the counter 12 to gradually reduce the occupancy of the reorder buffer 60 as the predicted time is approached.

By reducing the occupancy of the reorder buffer 60 as the predicted time is approached, the rate at which the reorder buffer 60 can be drained of entries can be increased, allowing the apparatus to respond more rapidly to an incoming interrupt. Therefore, the responsiveness of the system to an interrupt can be improved when it is predicted that a critical interrupt is imminent, without sacrificing the performance of the system at other times.

It is noted that although multiple different examples of the microarchitecture circuitry 8 are described (e.g. buffer circuitry within an SCU 38 and a reorder buffer 60), other examples are also possible. For example, any buffer in the data processing apparatus that might be accessed during the ISR, or at least need draining before the ISR can be performed, could be an example of microarchitecture circuitry 8 that may be adjusted between a performance based configuration and a responsiveness based configuration in dependence on the predicted time of reception of the next critical interrupt. Moreover, the present technique could be applied to multiple different microarchitecture circuits within a data processing apparatus at once—for example, the present technique may be applied to both buffer circuitry within an SCU and a reorder buffer 60 within the same data processing apparatus.

Figure 5:
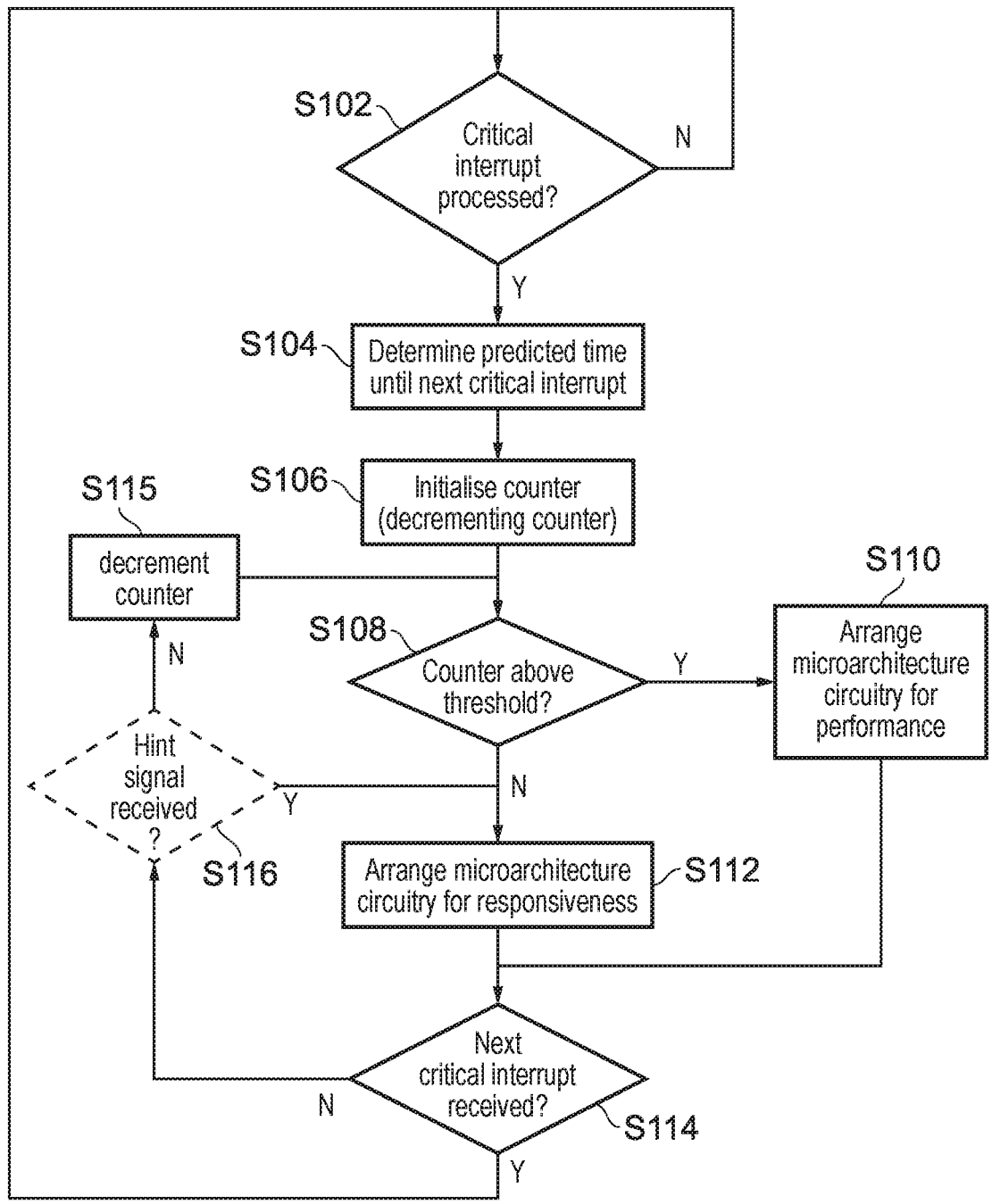
FIG. 5 is a flow diagram illustrating a method of using a counter set in response to processing a critical interrupt to control subsequent configuration of the microarchitectural circuitry.

FIG. 5 is a flow diagram illustrating a method of responding to processing of a critical interrupt. In the method of FIG. 5, it is first determined S102 whether a critical interrupt has been processed by the processing circuitry 6 (for example by performing an ISR). When it is determined that a critical interrupt has been processed, the predicted time until the next critical interrupt is determined S104 (for example by executing interrupt timing prediction software at a tail end of the ISR), and the counter 12 is initialised S106 in accordance with the predicted time. In this example, the counter 12 is a decrementing counter.

Once the counter 12 has been initialised, it is determined S108 whether the count value of the counter 12 is above a predetermined threshold. If it is above this threshold, the microarchitecture circuitry 10 takes steps to arrange the microarchitecture circuitry 8 for performance S110. If the microarchitecture circuitry 8 had previously been configured for responsiveness to interrupts, this step may involve returning the microarchitecture circuitry 8 to a more performance based configuration. Alternatively, if the microarchitecture circuitry 8 is already arranged in a performance based configuration, this step may involve maintaining the microarchitecture circuitry 8 in its current configuration (e.g. not altering the configuration of the microarchitecture circuitry 8).

On the other hand, when it is determined that the counter value is not above the predetermined threshold, the microarchitecture control circuitry 10 takes steps to arrange the microarchitecture circuitry 8 for responsiveness to interrupts S112. If the microarchitecture circuitry 8 had previously been configured for performance, this step may involve adjusting the microarchitecture circuitry 8 to a more responsiveness based configuration. Alternatively, if the microarchitecture circuitry 8 is already arranged in a responsiveness based configuration, this step may involve maintaining the microarchitecture circuitry 8 in its current configuration (e.g. not altering the configuration of the microarchitecture circuitry 8).

In either case, it is then determined S114 whether the next critical interrupt has been received. If it has been received, the method returns to step S102. On the other hand, if the next critical interrupt has not been received, the counter is decremented S115, and the method returns to step S108, optionally via an additional step S116 of determining whether a hint signal indicative of an upcoming critical interrupt has been received. If it is determined that no hint signal has been received, the method returns to step S108, whereas if a hint signal has been received, the method instead moves to step S112.

In this way, the microarchitecture circuitry 8 can be arranged for responsiveness when a critical interrupt is imminent, but arranged for performance at other times. This allows the processing system to be more responsive to certain interrupts, without sacrificing the performance of the system at other times.

Figure 6:
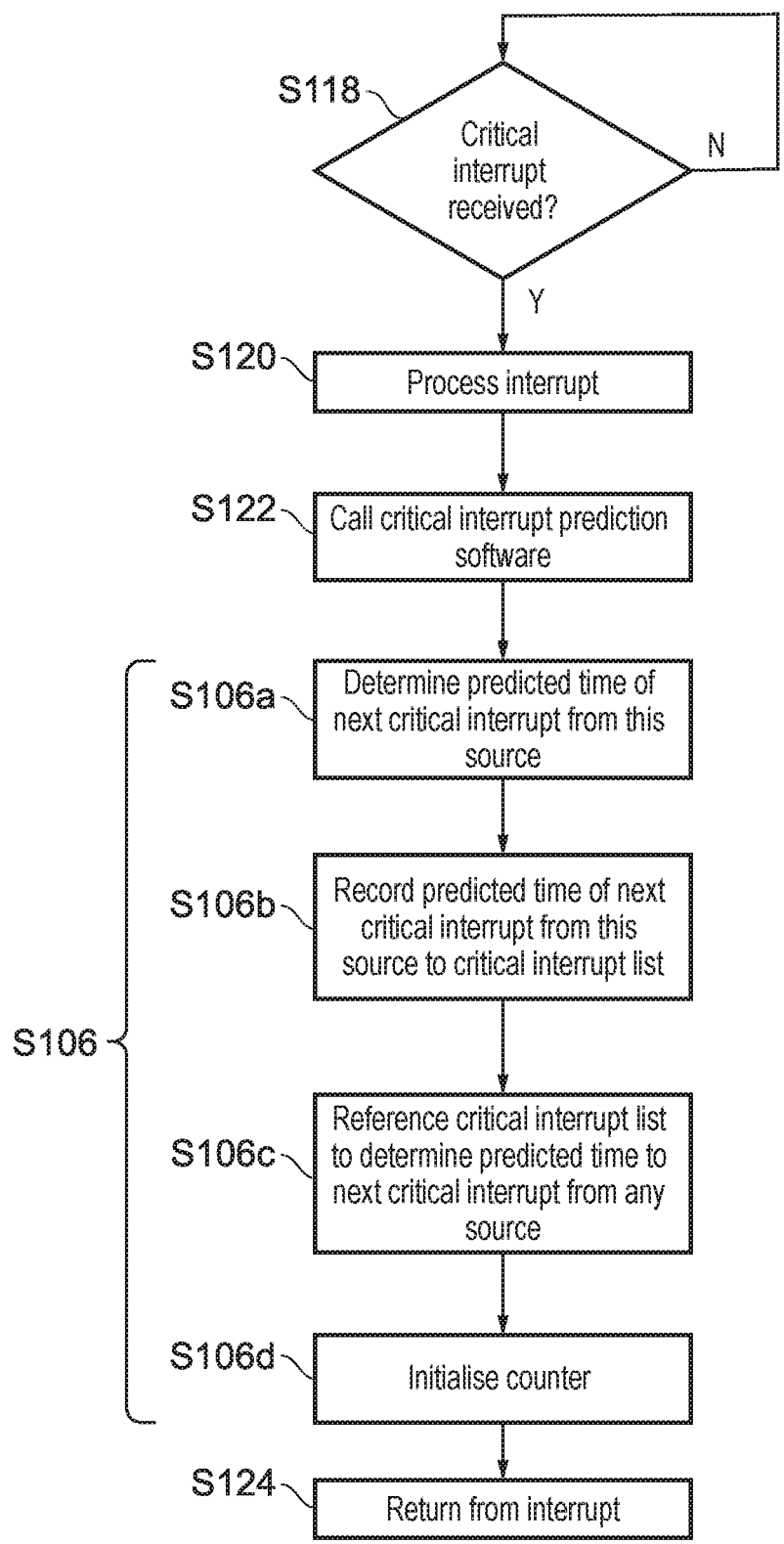
FIGS. 6 and 7 are flow diagrams illustrating example methods of responding to reception of a critical interrupt.

FIG. 6 is a flow diagram illustrating in more detail a method of initialising the counter 12. The method begins with determining S118 whether a critical interrupt has been received. When a critical interrupt has been received, processing of the current task by the processing circuitry 6 is suspended and the interrupt is processed S120 by performing an appropriate ISR. At the tail end of the ISR, the processing circuitry 6 is arranged to call critical interrupt prediction software S122. The critical interrupt prediction software is then executed S106 to initialise the counter. More particularly, the critical interrupt prediction software is executed to determine the predicted time of the next critical interrupt from the current source (e.g. the source of the current critical interrupt) S106*a*, and information indicative of this predicted time is recorded S106*b* in the critical interrupt list 22 (in the example discussed herein the actual predicted time is recorded). The critical interrupt list 22 is then referenced S106*c* to determine the predicted time of reception of the next critical interrupt from any source, and the counter 12 is then initialised S106*d* based on this predicted time. The processing circuitry 6 then returns S124 to the background processing that was being performed prior to reception of the interrupt at step S118.

Figure 7:
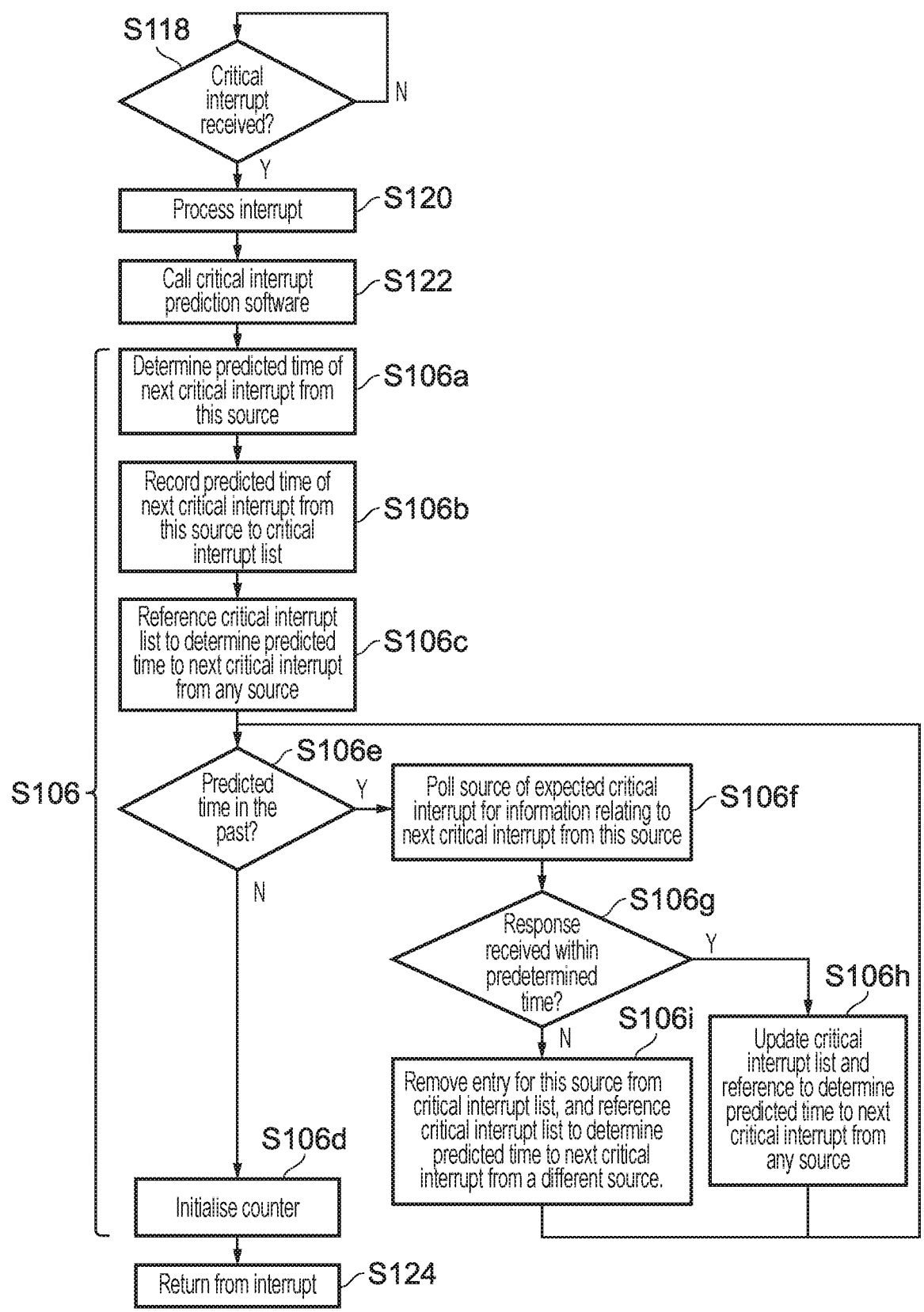

FIG. 7 is another flow diagram illustrating in more detail a method of initialising the counter 12 in accordance with one example implementation. In the method of FIG. 7, steps S118, S120, S122, S106a, S106b, S106c, S106d and S124 are as in FIG. 6. However, the method of FIG. 7 also involves, after referencing S106c the critical interrupt list 22, determining S106e whether the predicted time of the next critical interrupt from any source is in the past. If not, then the method continues to step S106d as in FIG. 6. However, if it is determined that the predicted time of the next critical interrupt from any source is in the past, the processing circuitry 6 is arranged to poll S106f the relevant source of that expected critical interrupt to request information relating to the timing of the next critical interrupt from that source. It is then determined S106g whether a response to the request has been received within a predetermined time. If a response has been received within the predetermined time, the processing circuitry 6 is arranged to update the critical interrupt list 22 based on the received response, and to reference the critical interrupt list 22 to determine the predicted time of the next critical interrupt from any source S106h, before processing returns to step S106e. On the other hand, if no response to the request was received within the predetermined time, the corresponding entry is removed (or invalidated) from the critical interrupt list 22 and the critical interrupt list is referenced to determine the predicted time of the next critical interrupt list from any source S106i. Processing then returns to step S106e.

Figure 8:
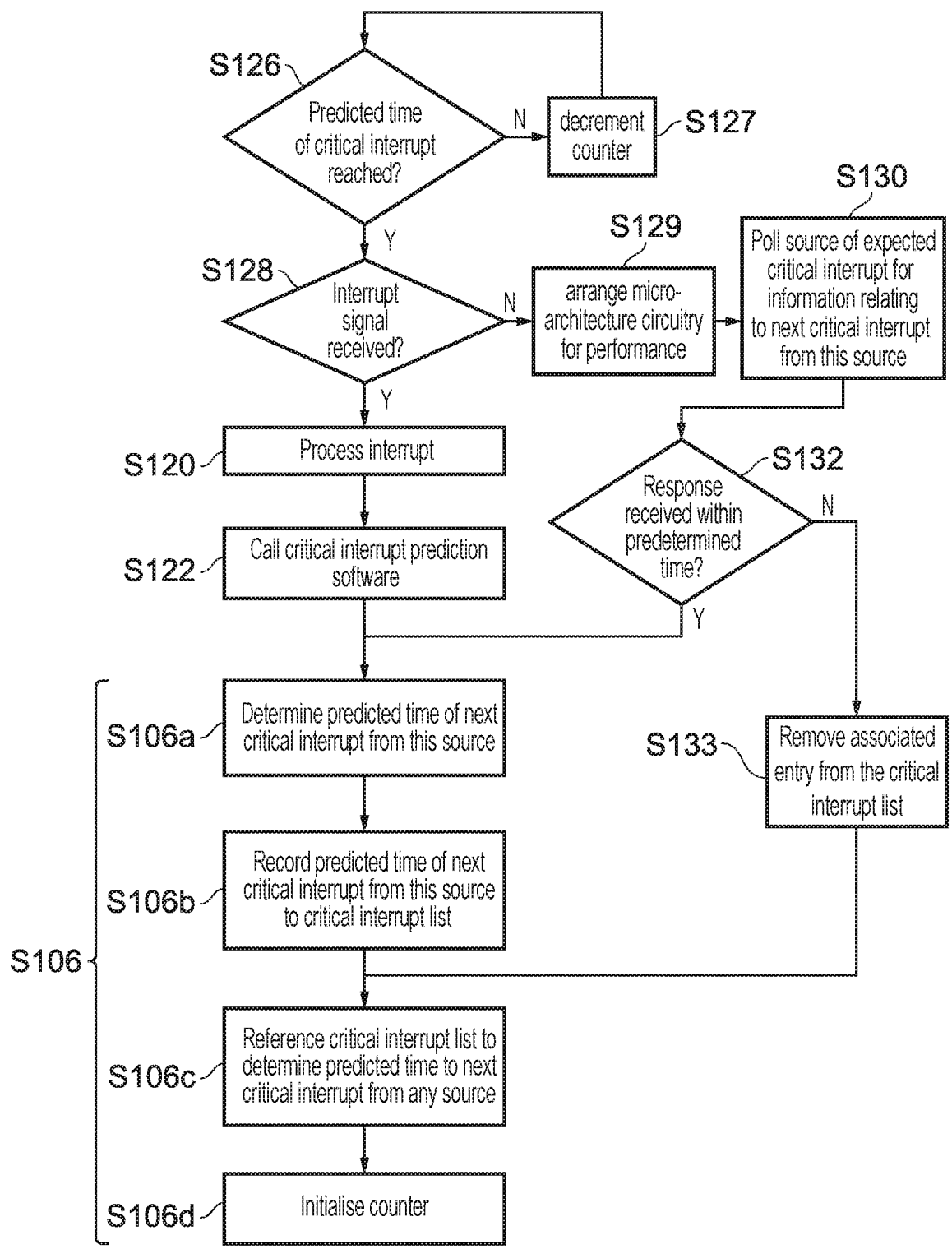
FIG. 8 is a flow diagram illustrating an example method carried out when the predicted time of a critical interrupt is reached.

FIG. 8 is a flow diagram illustrating a method of responding to the predicted time of reception of the next critical interrupt being reached. In particular, when it is determined S126 that the predicted time of reception of the next critical interrupt has been reached, the processing circuitry 6 checks whether the predicted interrupt signal has actually been received S128. If the predicted interrupt signal has been received, the method proceeds to steps S120, S122 and S106, as in FIG. 6. If the predicted time of the interrupt has not been reached, the counter is decremented S127.

On the other hand, if an interrupt signal has not been received, the microarchitecture control circuitry 10 is configured to arrange the microarchitecture circuitry 8 for performance S129—for example, by adjusting towards the performance-based configuration. The processing circuitry 6 is then arranged to poll S130 the source of the expected interrupt for information relating to the next critical interrupt from that source. It is then determined S132 whether a response has been received within a predetermined time. If a response is received in the predetermined time, the method proceeds to step S106a of determining the predicted time of the next interrupt from that source. On the other hand, if no response is received in time, the associated entry is removed from the critical interrupt list S133 and the method instead passes to the step S106c of referencing the critical interrupt list 22 to determine the predicted time of the next critical interrupt from any source.

As described above, the present technique allows the responsiveness of a data processing system to critical interrupts to be improved when it is predicted that a critical interrupt is imminent. By adjusting the configuration of at least one microarchitecture circuit based on the predicted time of reception of the next critical interrupt, the performance benefits of a performance based configuration can be maintained at times when a critical interrupt is not predicted to be imminent, without unduly sacrificing the responsiveness of the system when a critical interrupt is predicted to be immanent. Thus, the present technique provides the benefits of both improved performance and improved responsiveness to interrupts.

It should be appreciated that while the methods of FIGS. 5 to 8 have been discussed as separate examples, it is also possible to apply any combination of these methods within an apparatus in accordance with the present technique. For example, the method of FIG. 8 could also include steps S106e to S106i of FIG. 7.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
processing circuitry to perform data processing operations;
microarchitecture circuitry used by the processing circuitry during performance of the data processing operations; and
an interface to receive interrupt requests;
the processing circuitry being responsive to a received interrupt request to perform an interrupt service routine;
the apparatus further comprising:
prediction circuitry to determine a predicted time of reception of a next interrupt of at least one given type; and
microarchitecture control circuitry arranged to vary a configuration of the microarchitecture circuitry between a performance based configuration and a responsiveness based configuration in dependence on the predicted time, so as to seek to increase the responsiveness of the apparatus to interrupts as the predicted time is approached.

2. The apparatus of claim 1, wherein:
the prediction circuitry is counter circuitry to maintain a count value dependent on the predicted time.

3. The apparatus of claim 1, wherein:
the processing circuitry is arranged to execute interrupt timing prediction software to determine the predicted time and to set the prediction circuitry dependent on the predicted time.

4. The apparatus of claim 3, wherein:
the processing circuitry is arranged to execute the interrupt timing prediction software as part of the interrupt service routine.

5. The apparatus of claim 4, wherein:
the processing circuitry is arranged to execute the interrupt timing prediction software at a tail end of the interrupt service routine before returning to background processing that was being performed prior to the interrupt service routine being performed.

6. The apparatus of claim 1, wherein:
the at least one given type of interrupt comprises one or more types of interrupts having a priority above a threshold level.

7. The apparatus of claim 1, further comprising:
an interrupt list to maintain information relating to a predicted time of reception of a next interrupt of each of the one or more types, wherein
the processing circuitry executes interrupt timing prediction software to determine the predicted time based on the interrupt list and to set the prediction circuitry dependent on the predicted time.

8. The apparatus of claim 7, wherein:
the processing circuitry is responsive to determining that the predicted time of reception of the next interrupt is in the past to send a request to an external source associated with the next interrupt to request information indicative of a timing of the next interrupt.

9. The apparatus of claim 1, wherein:
the microarchitecture circuitry is buffer circuitry.

10. The apparatus of claim 9, wherein:
the microarchitecture control circuitry is configured to vary the configuration of the buffer circuitry in dependence on the predicted time to reduce occupancy of the buffer circuitry as the predicted time is approached.

11. The apparatus of claim 10, wherein:
the microarchitecture control circuitry reduces the occupancy of the buffer circuitry by reducing the number of usable entries in the buffer circuitry.

12. The apparatus of claim 9, wherein:
the buffer circuitry comprises a transaction queue.

13. The apparatus of claim 9, comprising:
snoop control circuitry to manage coherency of data stored in caches of a plurality of processing units,
wherein the buffer circuitry comprises one or more buffers associated with the snoop control circuitry.

14. The apparatus of claim 9, wherein:
the buffer circuitry comprises a reorder buffer used to support out-of-order execution of instructions by the processing circuitry.

15. The apparatus of claim 1, wherein:
for at least one interrupt of the at least one given type the predicted time is determined based on a periodicity of that interrupt.

16. The apparatus of claim 1, wherein:
the microarchitecture control circuitry is further responsive to a hint signal generated externally to the apparatus to vary the configuration of the microarchitecture circuitry between the performance based configuration and the responsiveness based configuration so as to seek to increase the responsiveness of the apparatus to interrupts,
the hint signal indicating an upcoming interrupt of the at least one given type.

17. The apparatus of claim 16, wherein:
the hint signal comprises a signal generated by an interrupt controller.

18. The apparatus of claim 16, wherein:
the hint signal comprises a signal generated by an external source of the upcoming interrupt.

19. The apparatus of claim 16, wherein:
the microarchitecture control circuitry is arranged, in the absence of the upcoming interrupt of the at least one given type being received within a predetermined time, to return the microarchitecture circuitry to the performance based configuration.

20. The apparatus of claim 1, wherein:
the microarchitecture control circuitry is responsive to a plurality of threshold times prior to the predicted time to vary the configuration of the microarchitecture circuitry between the performance based configuration and the responsiveness based configuration,
the microarchitecture control circuitry being responsive to at least one of the threshold times to set the configuration of the microarchitecture circuitry to an intervening configuration between the performance based configuration and the responsiveness based configuration.

21. A method of operating an apparatus, the method comprising:
performing data processing operations using microarchitecture circuitry;
receiving interrupt requests and responding to a received interrupt request by performing an interrupt service routine;
determining a predicted time of reception of a next interrupt of at least one given type; and
varying a configuration of the microarchitecture circuitry between a performance based configuration and a responsiveness based configuration in dependence on the predicted time, so as to seek to increase the responsiveness of the apparatus to interrupts as the predicted time is approached.

22. An apparatus comprising:
means for performing data processing operations using means for performing microarchitectural data processing operations;
means for receiving interrupt requests;
means for responding to a received interrupt request by performing an interrupt service routine;
means for determining a predicted time of reception of a next interrupt of at least one given type; and
means for varying a configuration of the means for performing microarchitectural data processing operations between a performance based configuration and a responsiveness based configuration in dependence on the predicted time, so as to seek to increase the responsiveness of the apparatus to interrupts as the predicted time is approached.

* * * * *